(12) United States Patent
Hodgson

(10) Patent No.: US 8,234,356 B2
(45) Date of Patent: *Jul. 31, 2012

(54) METHOD AND SYSTEM FOR COORDINATING DEVICE SETTING BETWEEN A COMMUNICATIONS CLIENT AND ITS HOST DEVICE

(75) Inventor: John S. Hodgson, Kanata (CA)

(73) Assignee: Research In Motion Limited, Waterloo, ON ( * ) Notice: Subject to any disclaimer, the term of this patent is extended or adjusted under 35 U.S.C. 154(b) by 415 days.

This patent is subject to a terminal disclaimer.

(21) Appl. No.: 12/556,327

(22) Filed: Sep. 9, 2009

(65) Prior Publication Data

US 2010/0058190 A1 Mar. 4, 2010

Related U.S. Application Data

(63) Continuation of application No. 11/188,761, filed on Jul. 26, 2005, now Pat. No. 7,603,447.

(60) Provisional application No. 60/592,130, filed on Jul. 30, 2004.

(51) Int. Cl.
*G06F 15/177* (2006.01)
(52) U.S. Cl. ......... 709/221; 709/220; 709/227; 709/228
(58) Field of Classification Search .................. 709/220, 709/221, 227, 228
See application file for complete search history.

(56) References Cited

U.S. PATENT DOCUMENTS

| | | | |
|---|---|---|---|
| 5,546,595 A | 8/1996 | Norman et al. |
| 5,758,071 A | 5/1998 | Burgess et al. |
| 5,968,133 A | 10/1999 | Latham et al. |
| 6,043,815 A | 3/2000 | Simonoff et al. |
| 6,044,205 A | 3/2000 | Reed et al. |
| 6,054,983 A | 4/2000 | Simonoff et al. |
| 6,078,321 A | 6/2000 | Simonoff et al. |

(Continued)

FOREIGN PATENT DOCUMENTS
GB 19992333866 8/1999

OTHER PUBLICATIONS

Sun Microsystems: "Excerpt from "Mobile Information Device Profiles, version 2.0, JSR 118", pp. 1-48, 115-127, 330-344, 431-500." [Online] Nov. 2, 2002, XP002497530 URL:http://java.sun.com/products/midp/>[retrieved on Sep. 25, 2008].

(Continued)

*Primary Examiner* — Phuoc Nguyen
(74) *Attorney, Agent, or Firm* — Moffat & Co.

(57) ABSTRACT

A system and method for propagating device settings to a data communications client from a host on a mobile device, the system having at least one host application adapted to operate on the mobile device host and further adapted to change device settings on the mobile device; a notification means adapted to notify the data communications client of device settings changes on the mobile device; a mode setting at the data communications client, the mode setting adapted to indicate whether client applications on the data communications client should use device settings from the host; and a client settings application adapted to receive a notification from the notification means and change device settings for the client applications if the mode setting indicates the client applications should use device settings from the host.

19 Claims, 14 Drawing Sheets

U.S. PATENT DOCUMENTS

| | | | |
|---|---|---|---|
| 6,078,322 | A | 6/2000 | Simonoff et al. |
| 6,091,412 | A | 7/2000 | Simonoff et al. |
| 6,334,178 | B1 | 12/2001 | Cannon et al. |
| 6,549,917 | B1 | 4/2003 | Pollard et al. |
| 7,123,933 | B2 * | 10/2006 | Poor et al. ............... 455/552.1 |
| 7,210,121 | B2 | 4/2007 | Xia et al. |
| 7,269,405 | B2 * | 9/2007 | Poor et al. ............... 455/403 |
| 2002/0099863 | A1 | 7/2002 | Comeau et al. |
| 2002/0099902 | A1 | 7/2002 | Comeau |
| 2002/0161957 | A1 | 10/2002 | Comeau et al. |
| 2003/0108039 | A1 | 6/2003 | Shell et al. |
| 2003/0191799 | A1 | 10/2003 | Araujo et al. |
| 2004/0088417 | A1 | 5/2004 | Bober et al. |
| 2004/0104883 | A1 * | 6/2004 | Drader ............... 345/102 |
| 2004/0111315 | A1 | 6/2004 | Sharma et al. |
| 2004/0117494 | A1 | 6/2004 | Mitchell et al. |
| 2004/0127190 | A1 | 7/2004 | Hansson et al. |
| 2004/0242209 | A1 | 12/2004 | Kruis et al. |
| 2004/0261114 | A1 | 12/2004 | Addington et al. |
| 2005/0001162 | A1 | 1/2005 | Schneider |
| 2005/0044164 | A1 | 2/2005 | O'Farrell et al. |
| 2005/0075115 | A1 | 4/2005 | Corneille et al. |
| 2005/0153693 | A1 | 7/2005 | Kaapa |
| 2007/0260655 | A1 * | 11/2007 | Adams et al. ............... 707/206 |
| 2010/0205436 | A1 * | 8/2010 | Pezeshki ............... 713/168 |

OTHER PUBLICATIONS

IPER Search Report, PCT/CA2005/001164 dated Feb. 2007.
EP 05734064 Search Report dated Nov. 2008.
EP 05768218, Examination Report dated Dec. 8, 2008.
International Search Report, Jun. 22, 2005.
International Search Report PCT/CA2005-01164 dated Nov. 19, 2005.
Official Action, U.S. Appl. No. 11/188,756, dated Dec. 18, 2008.
Official Action, U.S. Appl. No. 11/102,671 dated Oct. 17, 2008.

* cited by examiner

Host Platform Header (optional)
Example may contain a program name or status information

| JUL 26, 2004 | 10:03P | ◁ | M | T | W | T | F | S | S | ▷ |

9:00A ............................................................
10:00A ............................................................
11:00A ............................................................
12:00P ............................................................
1:00P ............................................................
2:00P ............................................................
3:00P ............................................................
4:00P ............................................................
▨5:00P▨ ............................................................

Host Platform Footer (optional)
Example may contain a status information

*FIG. 3*

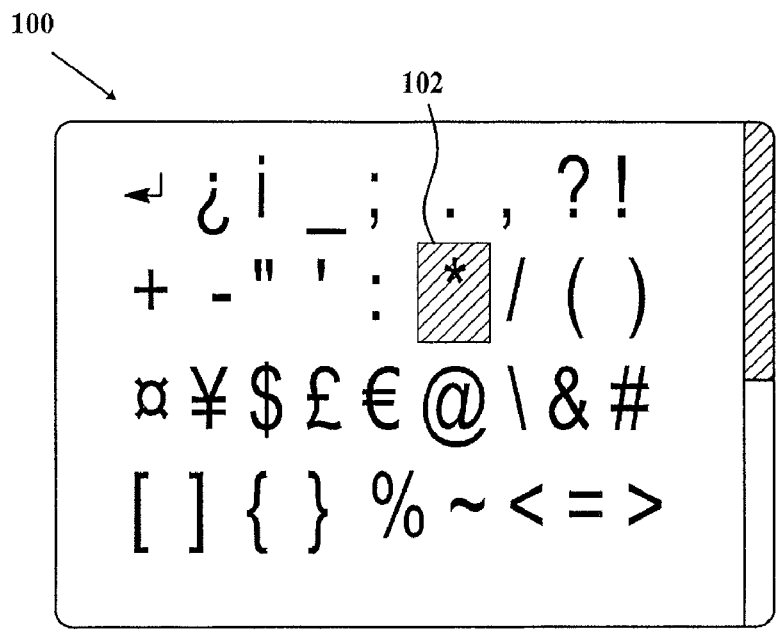
HOST SYMBOL 1
FIG. 6A
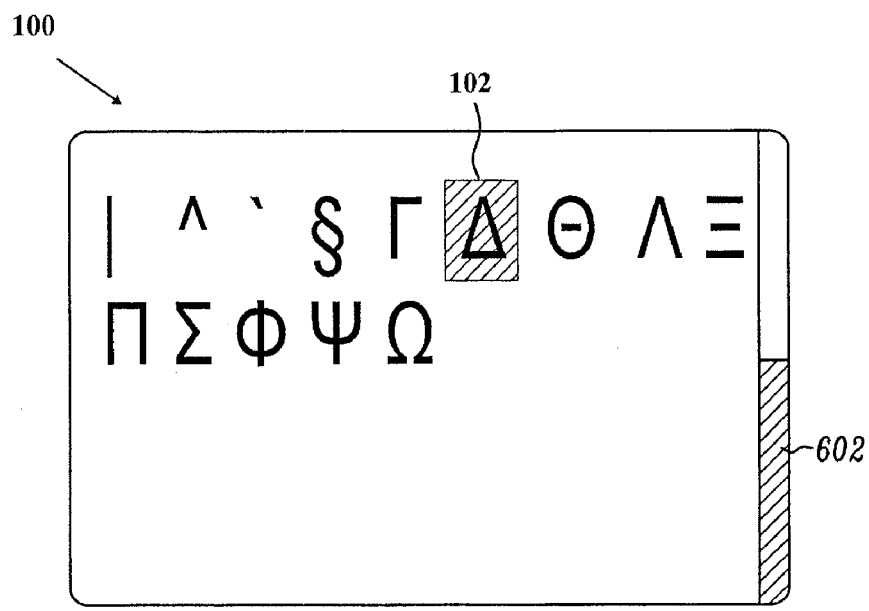
HOST SYMBOL 2
FIG. 6B
*FIG. 6*

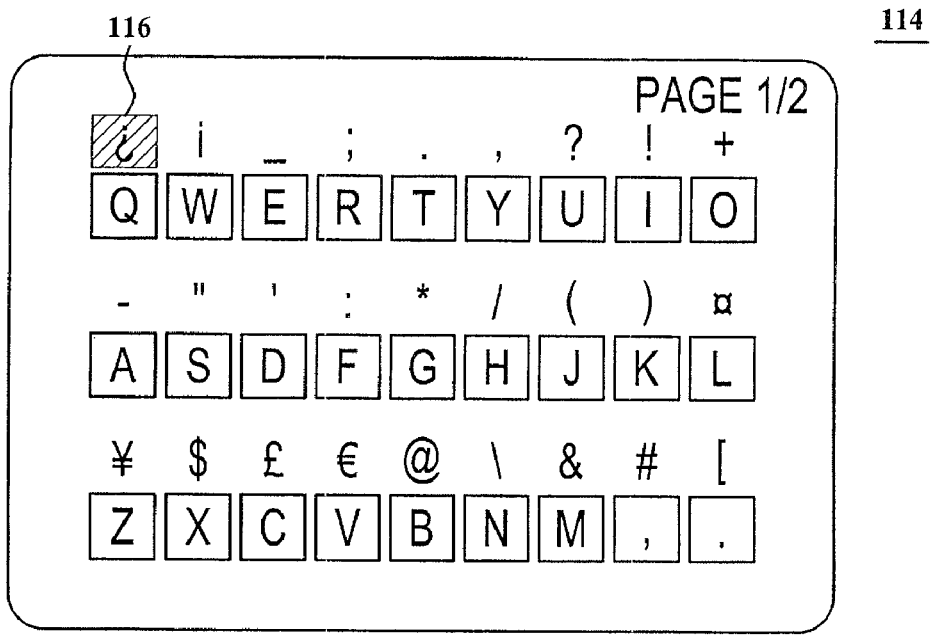
QWERTY
FIG. 8A
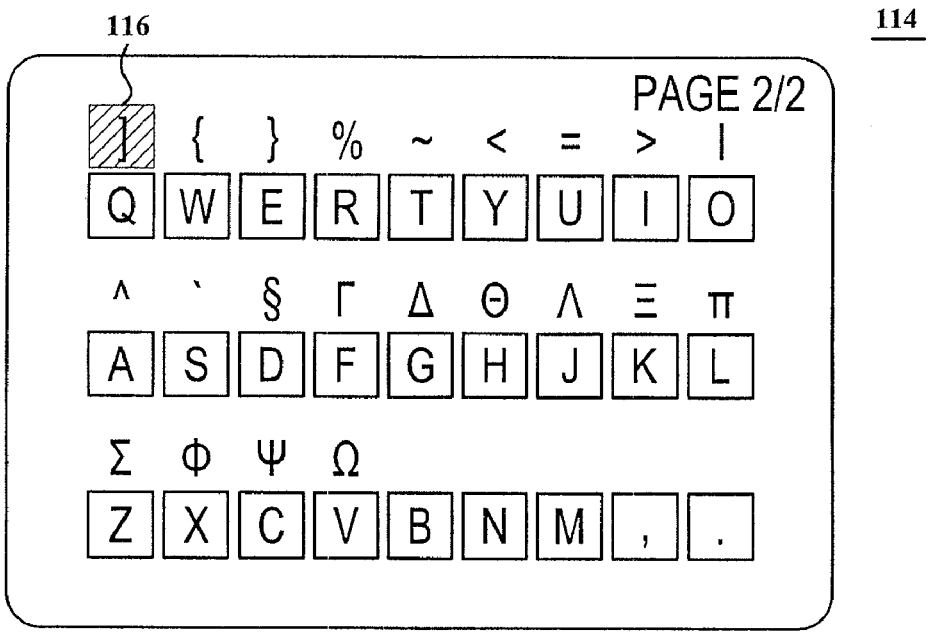
QWERTY
FIG. 8B
*FIG. 8*

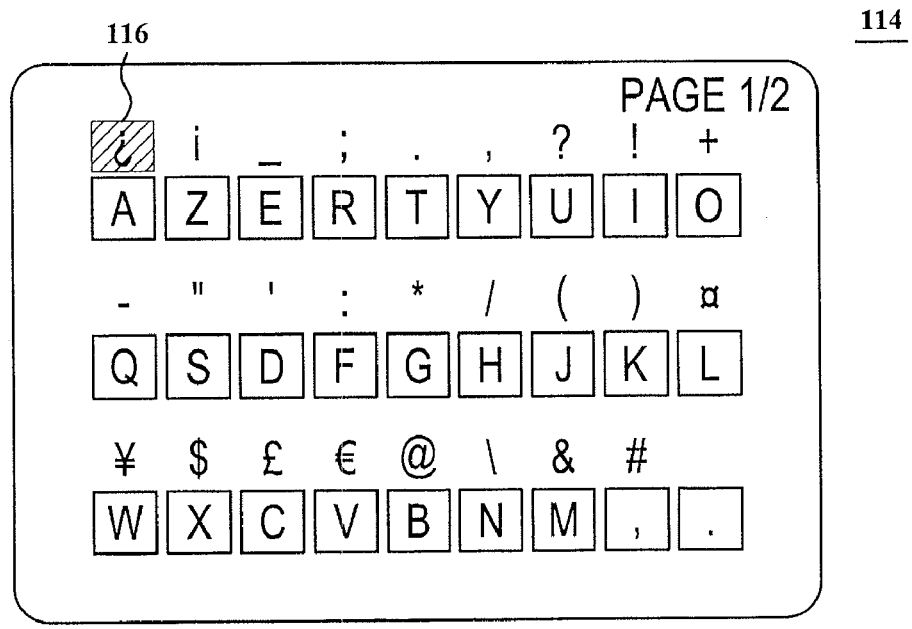
AZERTY
FIG. 9A
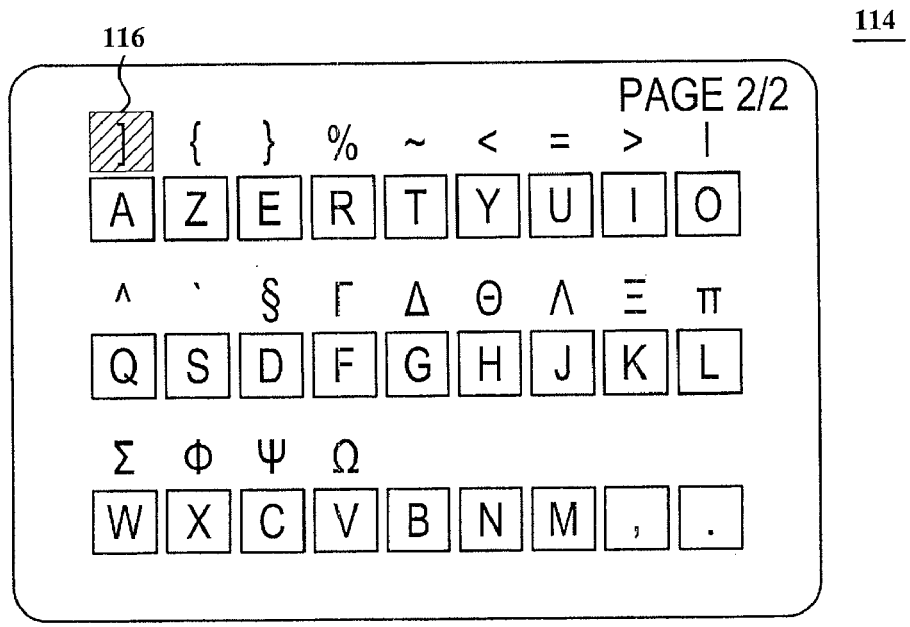
AZERTY
FIG. 9B
*FIG. 9*

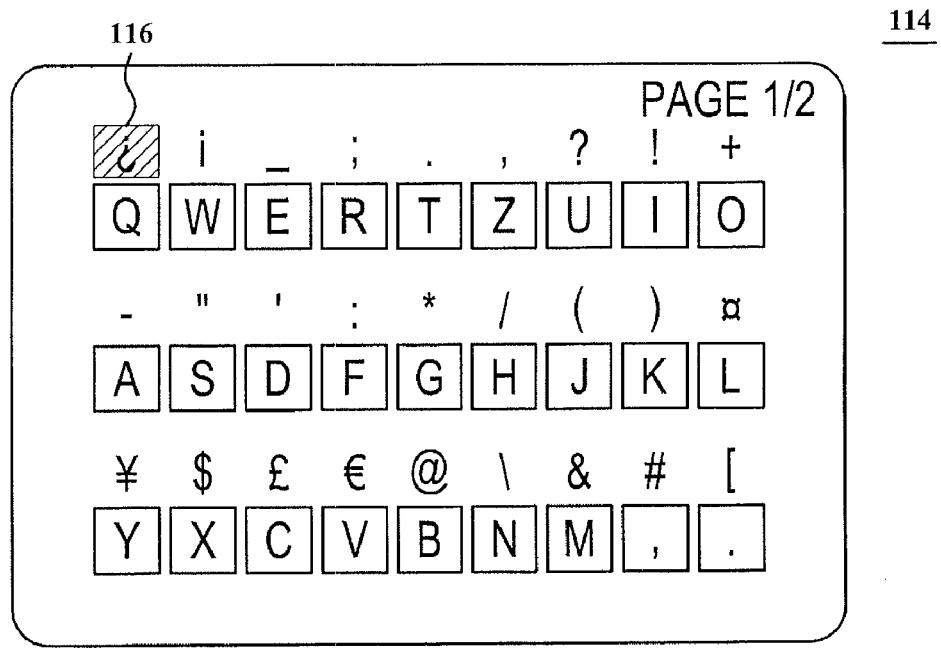
QWERTZ
FIG. 10A
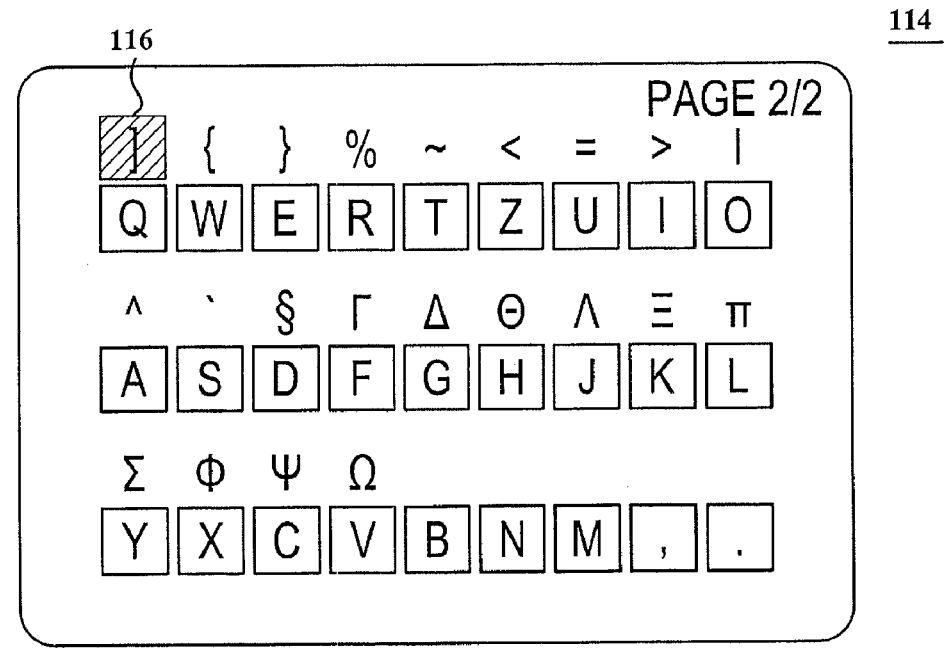
QWERTZ
FIG. 10B
*FIG. 10*

METHOD AND SYSTEM FOR COORDINATING DEVICE SETTING BETWEEN A COMMUNICATIONS CLIENT AND ITS HOST DEVICE

RELATED APPLICATIONS

The present application is a continuation of U.S. patent application Ser. No. 11/188,761, filed Jul. 26, 2005, which claims priority to U.S. Provisional Application No. 60,592, 130, Filed Jul. 30, 2004, the contents of both of which are incorporated herein by reference.

FIELD OF THE APPLICATION

The present application deals with the coordinating device setting between a data communications client and its host device, in particular, to the propagation of settings from the host to the data communications client when a client mode is set to adopt the host settings.

BACKGROUND

In a host wireless device, it is sometimes desirable to add a client onto the host to perform functionality that the host normally would not include. The host is typically certified with its software and hardware to communicate over a wireless network, whereas a client typically would not be. Further, certification could occur prior to the client being added, especially in the case that the client is integrated after-market onto the wireless device.

It is further desirable that the client is able to communicate with the native applications on the host and that the host applications are able to communicate with client applications. This communication preferably includes controlling a user interface on the host device from a client application, including registering inputs to the host device for the client application and displaying or outputting from the client application.

In some cases it is also desirable to be able to use device settings from the host environment in a client setting. Examples of this could include locale information, time zones, display themes, date format, time format or backgrounds. The automatic propagation of a change in host device setting would be preferable in some situations.

In one embodiment it is also desirable to have symbol inputs to a client correspond with symbol inputs to a host. It is further desirable that the input of symbols be simplified.

It is further desirable to be able to upgrade or downgrade the provisioning of a client directly from a host device without having to load new software on the host device.

BRIEF DESCRIPTION OF THE DRAWINGS

The present system and method will be better understood with reference to the drawings in which:

FIG. 3 is a screen-capture of a client application started from a host environment;

FIG. 6 is a view of a host symbol table;

FIG. 8 shows a 9*6 grid in a generally QWERTY keyboard layout with symbols mapped to certain letters;

FIG. 9 shows a 9*6 grid in a generally AZERTY keyboard layout with symbols mapped to certain letters;

FIG. 10 shows a 9*6 grid in a generally QWERTZ keyboard layout with symbols mapped to certain letters;

DETAILED DESCRIPTION OF THE DRAWINGS

Figure 1:
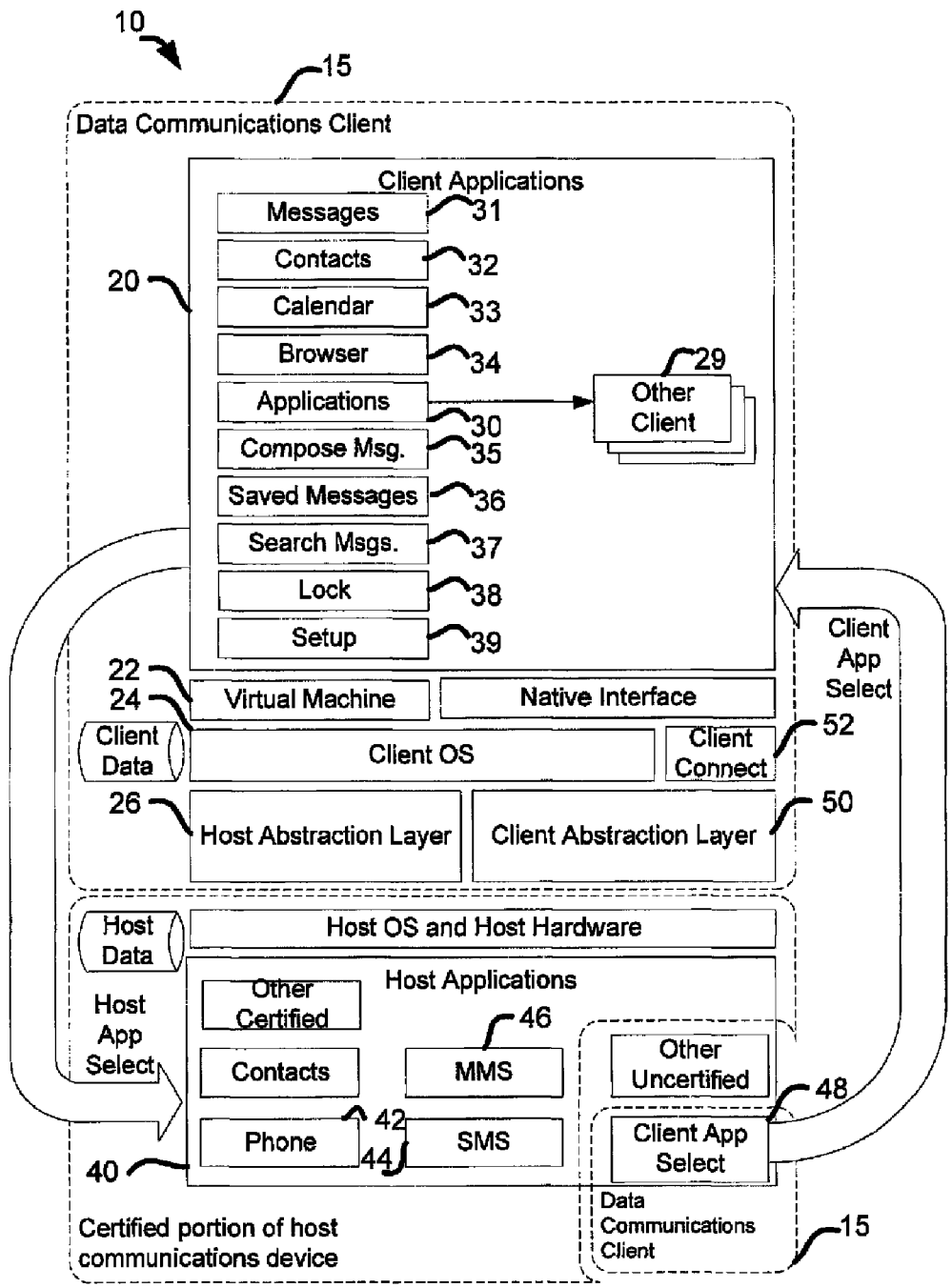
FIG. 1 is a schematic diagram of the components and dataflow according to the present system and method.

The present system and method provides a divided architecture for integrating a client into a host wireless device. One key to the present system is that the host is recognized as the dominant determinant in a divided architecture due to the fact that device type certification efforts (Global Certification Forum (CGF)/PCS Type Certification Review Board (PT-CRB)) may happen prior to the client being integrated onto the host. This necessitates that the host and tightly-tied applications to the host remain unfettered.

The present system and method provides a virtual machine that is started upon start-up of the host device and is used to run client applications. The virtual machine communicates through a client OS that would normally send client application commands and functions to host dependent features, such as hardware, software, firmware or communications networks. However, since the host dependent features are certified and controlled by the host device, the operating system instead communicates with abstraction layers. The abstraction layers have a native interface for communicating with host applications, allowing client applications to use the host dependent features by utilizing host applications.

Device setting such as locale, time zone, display themes, date format, time format and backgrounds can be set using a binary variable. In one mode, the client settings are adapted to automatically adjust when host device settings are changed. This change is propagated by either having a listener at the host to signal a change in device settings, or polling when a graphical interface of a client is brought to the foreground. In the other mode the client settings can be fixed at the client and changes at the host device are ignored.

A client application accesses the user interface of a host device using a host native application, a platform abstraction layer and a host independent engine communicating between the user interface and a client application. The host independent engine is platform independent and relies on the platform abstraction layer to translate and/or map function calls. The host native application depends on the user interface and host device, and is used to control actions and updates to the user interface.

One example of an input for the host native application is the input of symbols. In a system for inputting symbols to a client where the host has a native system for inputting symbols from a host symbol table by navigating a host cursor to move between adjacent symbols displayed within a host grid and the host further has a keyboard, the keyboard can be taken advantage of to map symbols to one keystroke. A client symbol table is created conforming to the host symbol table, and a grid is made where the indicia of at least one keyboard key is associated with a symbol such that when a user actuates a key in the keyboard, the cursor jumps to the corresponding symbol.

Provisioning of the device can be accomplished from software that is already loaded onto the device. By following steps from a client application on a host device provisioning of the client can be changed. A host device user is thereby enabled to upgrade or downgrade client service, i.e. to provision the data client The present application therefore provides a system for propagating device settings to a data communications client from a host on a mobile device, said system comprising: at least one host application adapted to operate on the mobile device host and further adapted to change device settings on the mobile device; a notification means adapted to notify the data communications client of device settings changes on the mobile device; a mode setting at the data communications client, said mode setting adapted to indicate whether client applications on the data communications client should use device settings from said host; and a client settings application adapted to receive a notification from the notification means and change device settings for said client applications if said mode setting indicates said client applications should use device settings from said host.

The present application further provides a method for propagating device settings to a data communications client from a host on a mobile device, said method comprising the steps of: changing device settings on the mobile device using at least one host application; notifying the data communications client of device settings changes on the mobile device; checking a mode setting at the data communications client to determine whether device settings changed at the host should be propagated to the data communications client; and if the checking step determines changes should be propagated, changing device settings for said data communications client.

The present system and method is directed to a divided architecture for a client on a host device. One example of such an arrangement would be a data-enabled cellular telephone with a data device client running on top of the host telephone environment. Other examples of clients running on host environments would, however, be known to those skilled in the art and the above is not meant to limit the scope of the present method and system. The examples below will use a host that is a cellular telephone and a client that is a data device client merely for illustration purposes.

A host device will require certification prior to being released for sale and use in a given market. Examples of certification include GSF- and PCS-type certification review board (PCTRB) certifications. These certifications are for the hardware and tightly-tied applications to this hardware.

In order to include a client that has communications capabilities without having to certify the client, the integration of the client requires a divided architecture in which the phone and the tightly-tied applications to the phone remain unaltered.

One example of an architecture to accomplish this is illustrated in FIG. 1. FIG. 1 shows a method and system for a divided architecture 10 which includes client applications 20 running on top of a virtual machine 22.

Client applications 20 can be any application that is designed to run on a virtual machine 22. In the example of FIG. 1, these could include a messages application 31 for viewing messages that have been received, a contacts application 32, which presents an address book including phone numbers, e-mail addresses or other contact information for individuals or companies, calendar application 33 for scheduling appointments and managing time, a browser application 34 for browsing the internet or other network, a compose-message application 35 to compose messages for SMS or e-mail, a save-messages application 36 to view messages that have been saved, a search-messages application 37 to search for a particular message, a lock application 38 to lock the keyboard and screen of the mobile device, and a set-up application 39 to change the set-up configuration for client 15. Other applications 30 could also exist as part of client applications 20 and the above-listed applications are not meant to be limiting. Further, other clients besides client 15 could exist on the host device and these other clients could have applications 29 which could be invoked from application 30.

Virtual machine 22 is preferably started at power-up of the host device and stays running no matter what. In one preferred embodiment, the virtual machine is a JAVA virtual machine and client applications 20 are JAVA applications.

All client applications 20 use virtual machine 22 to invoke instances of objects created by client applications 20.

A feature call such as a hardware call on system 10 from client applications 20 would normally go through client OS 24. Client OS 24 includes a number of primitives for interacting with hardware. However, in the case that client applications 20 are built onto a host device and because the host device has acquired certification for its host dependent features such as hardware, software and firmware, it is preferable that instead of interacting with the features directly, client OS 24 interacts with a host abstraction layer 26. Host abstraction layer 26 converts calls from client applications 20 to host calls through a native interface 28. Native interface 28 invokes host applications 40 in order to use the host dependent features on the host device.

Because host applications invoke the features of the host device rather than client applications directly utilizing the features, the above architecture provides that client applications 20 can run on a host environment and use the features of the host device without having to re-certify. This enables the client to be added to the host device after certification, including an after-market addition to the host device.

One example of a client application using the above includes the making of a telephone call when the host device is a cellular telephone. When in the host environment this simply involves using host applications to create the telephone call where these host applications use certified hardware, firmware and software to connect through the wireless system. However, when in a client application 20, the above architecture requires the invoking of a host application in order to make the phone call. A client application could be an address book or contact application 32 that includes phone numbers for individuals. A user may wish to select a phone number from the address book and have the wireless device phone that person. In order to accomplish this, a user may select the phone number and select an option to phone that phone number. In this case, contact application 32 indicates through virtual machine 22 to OS 24 that it needs to make a phone call. Instead of using the host dependent feature directly from OS 24, a notification is sent to host abstraction layer 26 which, through native interface 28 invokes the correct host application 40 to make the phone call. In the example of FIG. 1, this would be phone application 42. Phone application 42 then starts the phone call and the user proceeds as if the phone call was started from client application 20.

Similarly, client application 20 could give a user the option (instead of phoning the phone number) to use a short-message service or a multi-media message service to contact the individual. In each of these cases, a different host application 40 is invoked, but this is done similarly through the host abstraction layer 26 and native interface 28. In the example of FIG. 1, these host applications include SMS application 44 or MMS application 46.

An alternative example of a client application 20 could be an e-mail message that includes a phone number within it, for example, in messages application 31. Messages application 31 could give a user the option to contact the phone number with the message. A phone-related application 42, short-message service (SMS) application 44, or multi-media message service (MMS) application 46 is started within host applications 40. This is done through the client OS 24 to the host abstraction layer 26 where the request is converted with a native interface 28 for a host application 40.

As one skilled in the art will realize, data is supplied between the applications 20 and host applications 40. In the example above, the phone number would be supplied to host application 40 including phone application 42, SMS application 44, and MMS application 46.

Figure 2:
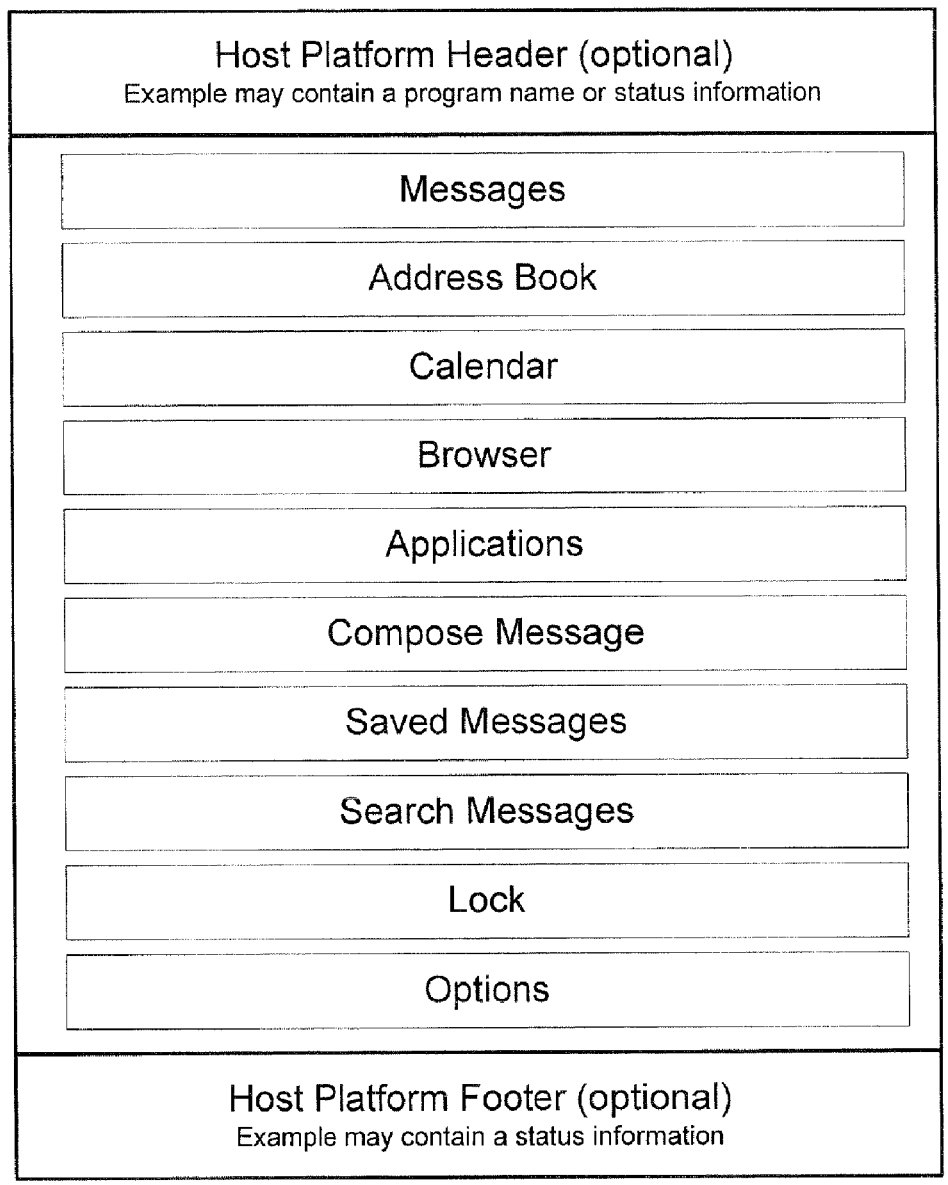
FIG. 2 is a screen-capture of a host application showing various applications that can be selected in the host environment.

It is further desirable that a client application can be activated from a host application 40. Reference is now made to FIG. 2. FIG. 2 shows a screen capture of a host application. The host application lists a series of client applications that can be activated. As used herein, activated can mean to both start a client application 20 or to bring an already started client application 20 to the foreground. In order to activate a client application 20, the user scrolls to the client application that s/he desires and selects the client application. Reference is made again to FIG. 1. When an application is selected in the host environment, a client application selection application 48 uses a set of application programming interfaces (APIs) by which the host operating system can request a client application 20 to activate.

Client application selection application 48 uses a client abstraction layer 50 to activate an application within client applications 20. Client application selection application 48 calls a function that is translated in client abstraction layer 50. Client abstraction layer 50 then uses virtual machine 22 to activate a client application 20.

Client abstraction layer 50 in alternative embodiments can either inject the client OS 24 event into virtual machine 22 which causes the selected client application 20 to become active or, alternatively, performs a "reverse native call", either through client OS 24 or via client connect 52 to manipulate the native representation of some client object which causes the selected client application 20 to become active.

Client connect 52 can be used for network features for client applications. This enables, for example, client 15 to communicate using a specific protocol that was not originally supported on the host device. Client connect 52 involves a protocol stack to perform this messaging, and thereby increase and improve client functionality.

Figure 4:
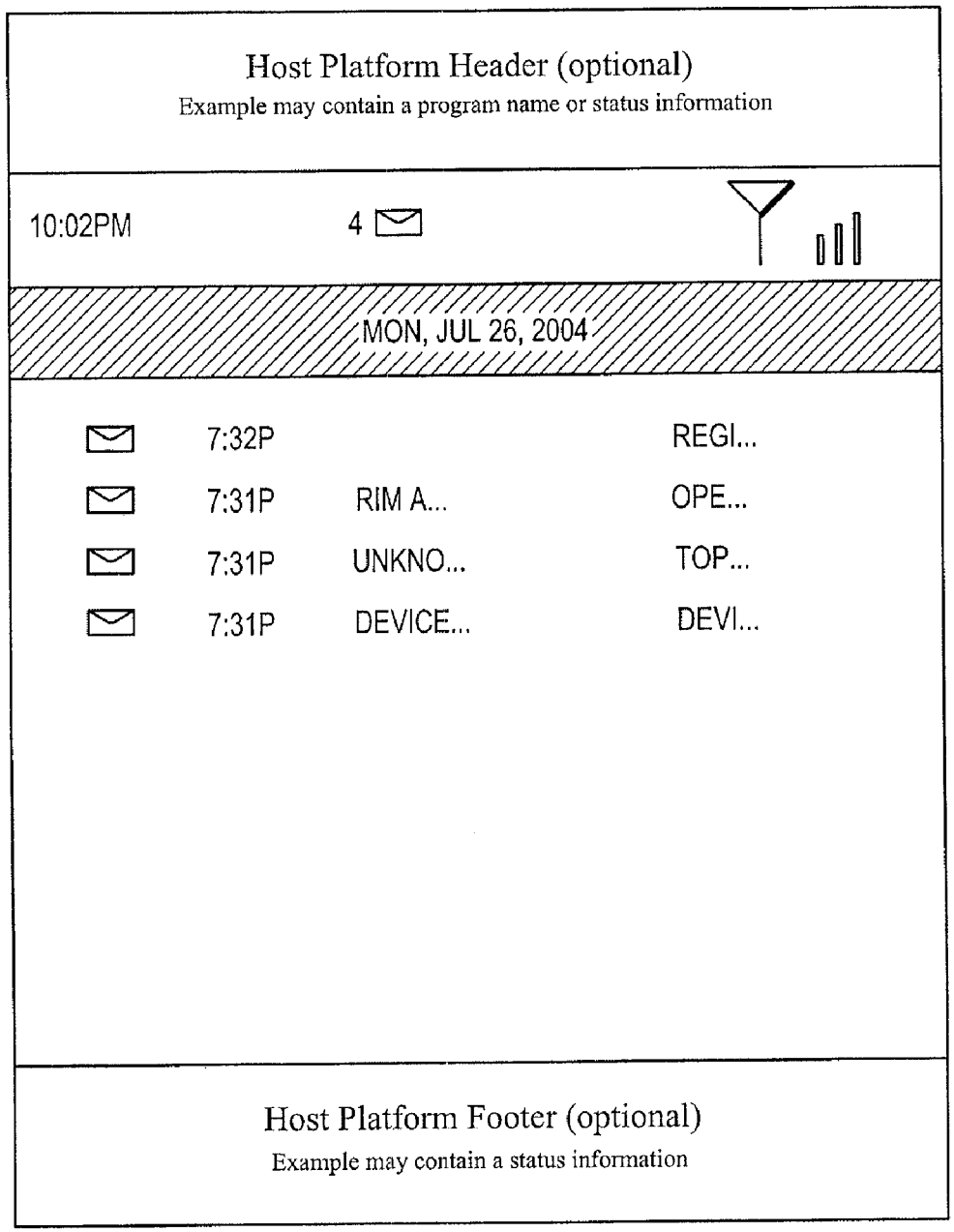
FIG. 4 is a screen-capture of a client application started from the host environment in a host application.

An example of the above is a client calendar application as illustrated in the screen-capture FIG. 3, or a client e-mail application as illustrated in the screen-capture FIG. 4. Requests for a client application to be activated are converted into function calls through native interface 28, which, in turn, makes calls on client applications 20. These applications 20 are then brought into the display foreground.

FIG. 3 represents calendar application 33 and FIG. 4 represents a screen-capture of the display of messages application 31. As will be appreciated by one skilled in the art, a screen bar or other marker on the screen capture could be used to indicate that the client is in the host environment.

Alternatively, client application selection application 48 may communicate directly with virtual machine 22 in order to activate a client application 20. This may occur, for example, in the case where client application selection application 48 knows the code or a hook to start client application 20.

Once virtual machine 22 receives a message to activate an application, either from the client application selection application 48 directly or through client abstraction layer 50, a client application is activated and needs to assume control of the host user interface. In order to do this, client application 20 makes a call back to client application selection application 48 indicating that client application 20 needs the user interface. Client application selection application 48 then uses host code to take over the UI and thus becomes a portal between client application 20 and the host. Client application selection application 48 adapts all of the host inputs to events for the client and takes over control of the user interface. Client application selection application 48 is an uncertified embodiment of a host native application 60 described in more detail below. As will be appreciated by one skilled in the art, other embodiments could by certified.

If the host requires control of the user interface back, client 15 is notified through client application selection application 48 of this.

It is further desirable when using a host and a client that the device settings be synchronized in certain situations. Device settings could include locale settings, time zone settings, date format settings, time format settings or theme settings. Locale, as described herein, includes various settings such as the language of the interface, for example, English or French or Spanish. It could also include the keyboard configuration, e.g., QWERTY, AZERTY, QWERTZ or DVORAK. Theme settings could include color patterns and background images.

In setup application 39 referred in FIG. 1, a user can choose between a mode that allows the user to use host settings for the device settings or custom settings. As one skilled in the art will appreciate, a different mode setting could be used for theme, locale and time zone, or these could be all included in one mode setting.

If the mode is set to the host settings, the device settings for the client are synchronized with the host's device settings. Any changes in the host's device settings are propagated to the client and the client's device settings are, therefore, also changed. For example, if a user changes the language from French to English in a host application 40, this is propagated to client 15 and client applications 20 will use English.

In the case where the client display is set to mimic the host display, propagation of changes in the host display is accomplished by having a listener application monitoring the host device settings. Upon a change in the host device settings, the host listener will notify setup application 39 that a change has been made to the host device settings and this change will be reflected in the client device settings.

Alternatively, propagation of a change in the device settings could include polling every time a graphical user interface from the client takes over. This polling involves comparing the host device settings with the client device settings and thereby determining if a change has been made. If a change has been made, the client device settings are updated.

Thus if the mode is 'automatic' or 'host settings', changes in the host device settings are pushed to the client, either through a listener or by polling, as described above.

If, conversely, the mode is set to 'manual' or 'client settings', the user can update the device settings in the client and client applications will use these display setting instead of the host device settings. If the mode is set to 'client settings', changes to the host's device settings will be ignored by client applications 20.

Figure 14:
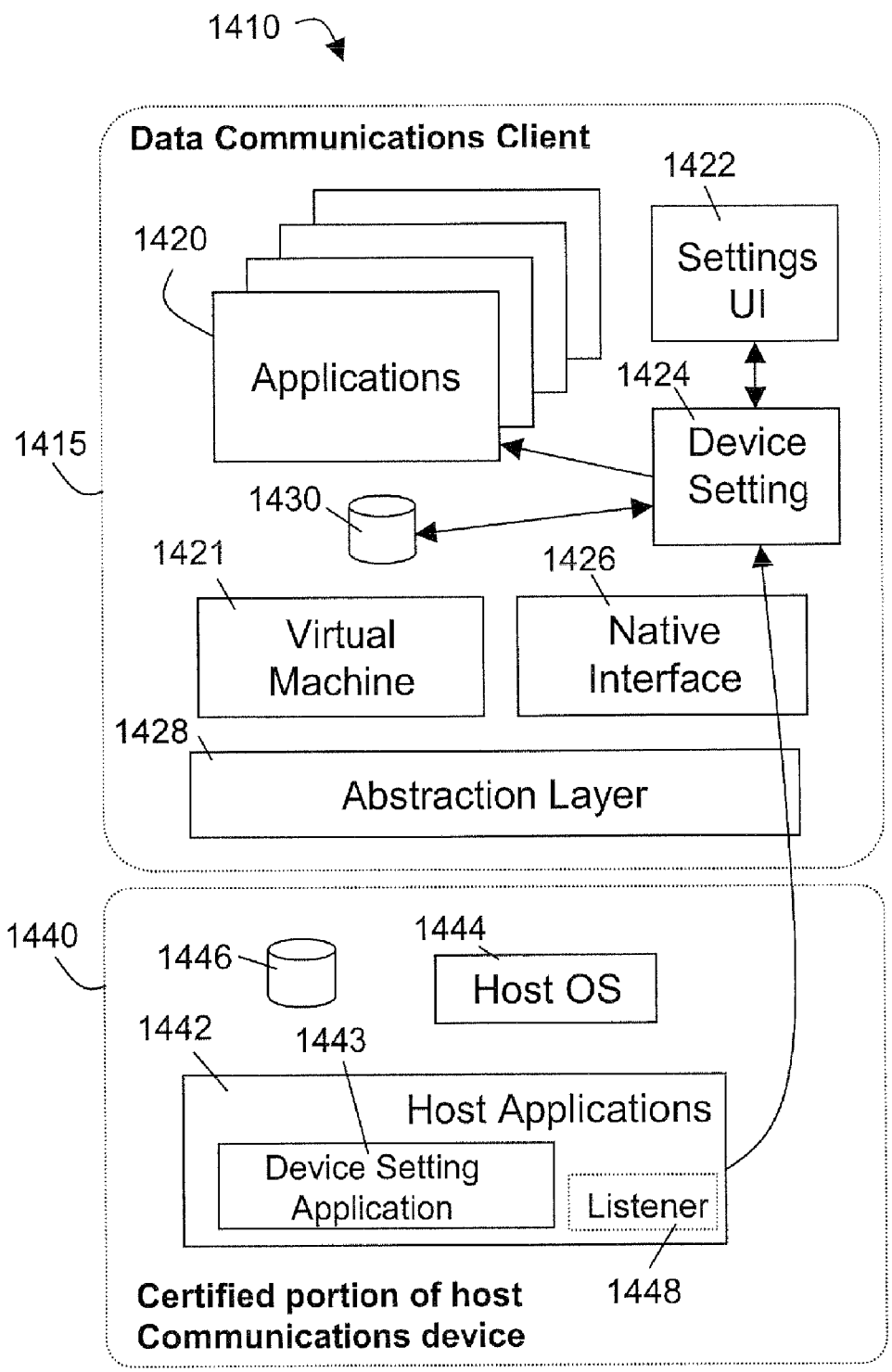
FIG. 14 is a block diagram illustrating the propagation of changes in the host environment to the data communications client.

The above is better seen with reference to FIG. 14. A mobile device 1410 includes a data communications client 1415 on a host communication device having a certified portion 1440 for communications with the network. Host device includes host applications 1442 which include a device setting application 1443 allowing the user to change device settings. As described above, these settings can be various things including time zone settings, theme settings, locale, date formats, time formats or other settings that the user may wish to have both on the host and the client side. For example, the user may wish to use a 24-hour format rather than a 12-hour format for time display and may change this in device setting application 1443.

As will be appreciated, host applications run on a host operating system 1444 and the host device includes storage 1446.

Once a user changes a device setting in device setting application 1443, this information is propagated to a device setting application 1424 located on data communications client 1415. Device setting application 1424 would then propagate the change to the applications 1420 that the change affects. As will be appreciated by those skilled in the art, the update step from device setting application 1424 may be a global message sent to all applications 1420 or may be sent to selected applications, for example through a registration means where applications indicate to device setting application 1424 that they are interested in certain parameters. The change notification is sent through abstraction layer 1428 and native interface 1426 as described above and applications 1420 run on virtual machine 1424.

Device setting application 1424 may also access client storage 1430.

In one embodiment, the user has the option of telling the data communications client 1415 to ignore changes made on the host environment. In this case, the user through settings user interface application 1422 indicates to the client that changes made on the host environment should be ignored. In this case, device setting application 1424 will first check with settings user interface application 1422 to determine whether the change should be propagated to applications 1420. As will be appreciated by those skilled in the art, instead of device setting application 1424 checking with settings user interface application 1422, device settings application 1424 could check a flag which is persisted, preferably in non-volatile storage, and indicates whether it should propagate the changes to applications 1420 and this flag could be set based on settings user interface application 1422.

In order to propagate changes from host applications 1442, device setting application 1443 could send a message to device setting applications 1424. This could be a periodic message or instigated whenever device setting applications 1443 is changed. Further, a listener 1448 could be employed to monitor when device setting application changes are made in which case they will notify device setting application 1424.

Based on the above, changes made in the host applications can be reflected in client applications in order to provide a user with a consistent environment to operate in.

A further consideration for the above will be referred to herein as conflict resolution. In some instances, device settings that may be set in the host environment may not have an equivalent in data communications client 1415. For example, if the user sets the device language to Swahili in the host environment using device setting application 1443, this would get propagated to device setting application 1424. However, device setting application 1424 may not have a Swahili language setting for applications 1420. In this case, a conflict resolution scenario needs to be employed.

A first option for conflict resolution is an automatic mapping. In this case, the device will have a set of pre-programmed options that are available at the host which are not also available at the data communications client 1415. The list of exceptions further include alternatives that the data communications client 1415 should employ should the user select one of the non-supported options on the host side. Thus, for example, if the user selects a language such as Swahili that the data communications client 1415 does not support, device setting application 1424 may choose to proceed with English as the alternative language setting.

Alternatively, device setting application 1424 may prompt the user for a decision when an unsupported option is selected at the host side. Using the above example, if the user selects a language not supported by the data communications client, device setting application 1424 may prompt the user for an alternative language for data communications client or may ask whether the alternative that the device setting application has chosen is suitable.

As will be appreciated by those skilled in the art, exceptions will exist outside of language settings and may include, for example, time zone settings in certain parts of the world, unsupported theme settings or other options known to those skilled in the art. The above is not meant to be limiting and the present application could include all of these conflict situations, among others.

Figure 5:
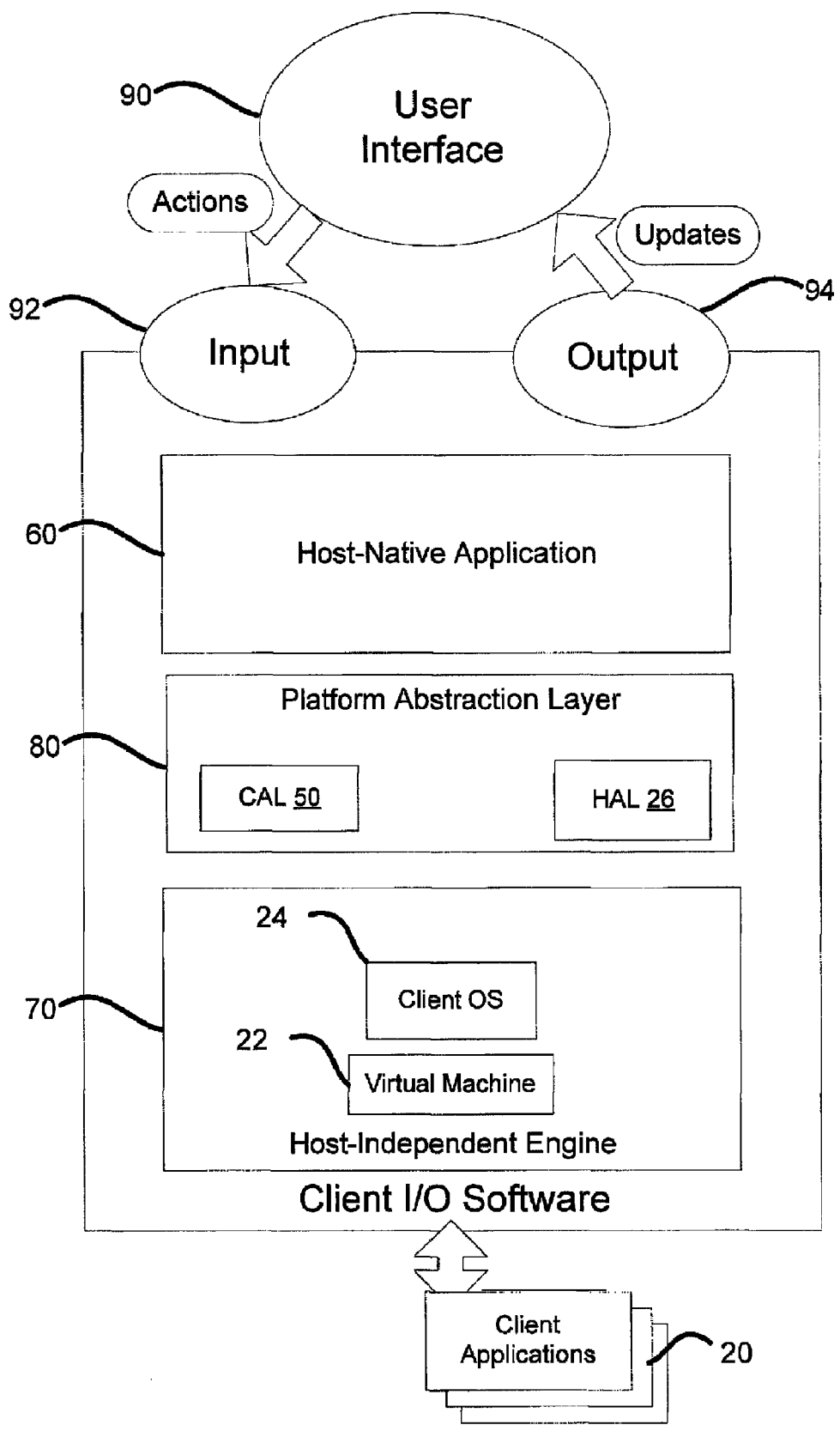
FIG. 5 is a schematic diagram of the components and dataflow for a user interface according to one aspect of the present system and method.
Figure 7:
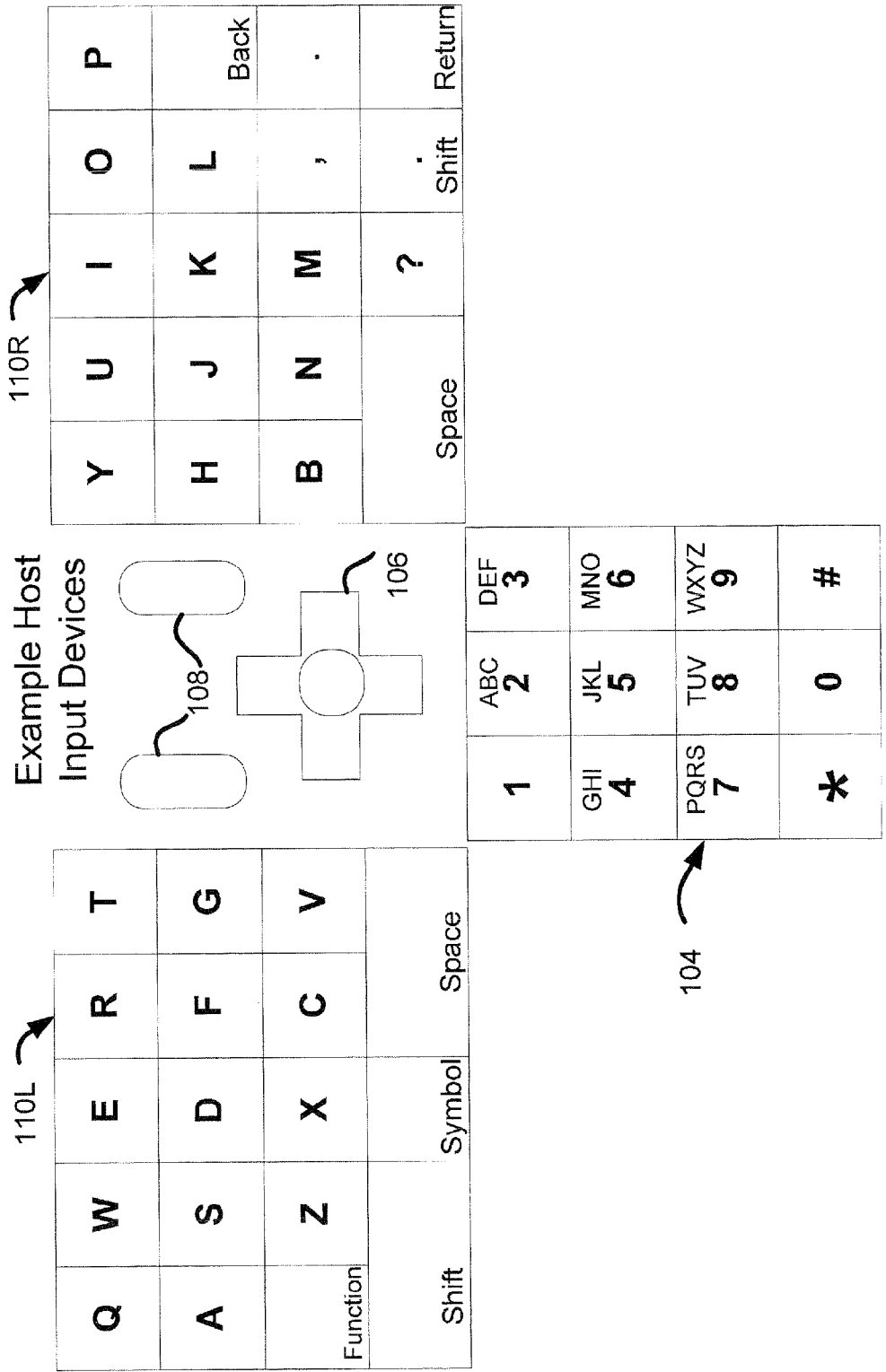
FIG. 7 is a view of various input options on a host device.

Reference is now made to FIG. 5. In order to interact with a user of a host device, client applications 20 need to provide a user interface 90. On a host device having one or more input devices such as a keypad, keyboard, roller wheel, scrollstrip, touch-pad, d-pad or other navigation device, and a screen, a user must be able to input actions for client applications 20, and the results of the input and client applications 20 operations need to be displayed on the screen. In order to accomplish this, three components are provided within the I/O architecture of the present system. These are a host-native application (HNA) 60, platform abstraction layer (PAL) 80, and a host-independent engine (HIE) 70.

HIE 70 is a platform independent component. Since PAL 80 contains the host abstraction layer (HAL) 26 and the client abstraction layer (CAL) 50, translation between the client and the particular host is performed in it. In a preferred embodiment PAL 80 is a C function interface.

HIE 70 includes both virtual machine 22 and client OS 24. These are used to activate, start, or call instances of objects in client applications 20 when client 15 is object oriented, or call functions in client 15 when it is not.

HNA 60 resides beyond PAL 80, and thus can adapt user interface 90 to conform and adapt to a particular host on behalf of client applications 20. HNA 60 can take radically different forms depending on the design of the host application infrastructure and the user interface requirements of the host operating system. For example, it is envisaged that in alternate embodiments, a keyboard and display user interface are required, or alternatively a radically different voice-only interface can be provided. HNA 60 is responsible for creating the framework necessary to receive input and update output when a user brings a client application 20 to the foreground. In a keyboard/display embodiment, this may involve creating windows, buttons or graphics widgets of any kind. In a voice-only host embodiment, this may involve speech recognition and voice synthesis.

For input 92, HNA 60 is responsible for passing user actions to HIE 70 through platform abstraction layer 80.

Inputs 92 can include button presses, keystrokes, stylus inputs, roller wheel motions, scrollstrip motions, touch-pad motions, d-pad motions, voice commands, accelerometer motions or other inputs that would be known to those skilled in the art. These inputs are translated and/or mapped as received from the host operating system and fed through the input function of the platform abstraction layer 80.

For output 94, HNA 60 may receive screen updates from HIE 70 at any time, including when client application 20 is not in the foreground. These updates must be stored and memory is used by HNA 60 to maintain a complete frame buffer copy separate from the application display area. If HNA 60 is in the foreground when receiving an update from HIE 70, then the application display area must be updated as well as the frame buffer so that the display on the host device reflects the screen change immediately. Whenever HNA 60 transitions into the foreground, it must update the application display area with the complete contents of the frame buffer.

Other output 94 types envisaged include audio tones, voice, and signals to actuate host-specific features, such as an offset motor or led for discrete notification or indication.

In a preferred embodiment, HNA 60 uses a framework that updates the user by simply displaying a graphic image provided by PAL 80, and processes user actions by adapting them to be sent down as events to PAL 80. This greatly reduces the complexity of HNA 60 thus enhancing the portability of the client to other host devices.

Reference is now made to FIGS. 6-10 which illustrate a specific example of how HNA 60 adapts user actions and provides a user interface on behalf of client applications adapted to the semantics of a particular host.

First, a system for symbolic input on a particular host is shown in FIG. 6. The system employs a particular semantic for symbolic input that the users of traditional application on the host will expect to be valid on all applications utilized on the host.

Operationally, host graphical user interface element 100 offers a 9×6 symbol table to a user. Cursor 102 is moved along a 9×4 grid in order to select a symbol. Since the number of rows of the grid is smaller than that of the table, the symbols are offered on two pages, Referring now to FIG. 7, the user may manipulate any number of input devices on a particular host, including a keypad 104, a 4-directional D-pad 106, rocker switches 108, as well as a QWERTY keyboard provided in two portions, a left keyboard portion 110L and a right keyboard portion 110R. Most notably, the host semantics for symbolic input on this particular host require that cursor 102 be moved on the grid by manipulating D-pad 106 to select a particular symbol.

In this particular example, HNA 60 preserves the semantics of symbolic input on the host while adapting actions a client application user is likely to desire for symbolic input given the data-centric features of client applications 20.

Referring now to FIG. 8, operationally, client graphical user interface element 114 offers a slightly different 9×6 symbol table on two pages, wherein symbols can still be selected by operation of d-pad 106, thus preserving the host symbolic input semantics. Cursor 116 is now moved however on a 9×3 grid instead of a 9×6 grid. This grid height is preferable in order to be able to map one row of each of the letter rows of the keyboard of FIG. 7 to one of the symbol rows of the grid. The width of the grid is maintained the same as in the host graphical user element 114 to allow a traditional host application user to quickly learn the layout of the symbol table while utilizing client applications, and to continue to contemporaneously support the use of the d-pad 106 for selecting a symbol.

Thus, a user is enabled to directly input one of 27 symbols using one keystroke instead of having to resort to using the d-pad 106-D, while still accepting input using d-pad 106-D.

Note that the embodiments of FIGS. 8-10 deliberately do not use the right-most key of the top row of a standard keyboard, i.e. in the case of the embodiment of FIG. 8, the key marked by the 'P' indicia in right keyboard portion 110R, since the topmost rows of the three standard keyboards shown herein contains 10 keys. This has been shown above to provide advantages and thus should not be considered a limitation. Nonetheless, it is envisaged that the techniques taught herein could be adapted to other keyboard layouts and grid sizes on a per host basis by those of skill in the art, and thus those adaptations are also within the scope of this application.

In alternate embodiments, the unused keys can remain unutilized, or they can be assigned a function to further enhance symbolic input, such as toggling between the various symbol pages. It is also envisaged that toggling between symbol pages can be accomplished by use of any one of the many other keys available on the particular keyboard available on the host keyboard.

FIGS. 9 and 10 illustrate how the HNA 60 can further adapt and conform to the semantics of variants of a host. In particular, FIG. 9 shows adaptation and conformity to a host variant having an AZERTY keyboard, and FIG. 10 shows the same in the case of a QWERTZ keyboard. Note that in each case, the indicia used in user interface element 114 conforms to the layout of the particular host keyboard, and that the input actions taken by the user are adapted to select the corresponding symbol.

To summarize the example, for input, HNA 60 adapts keystrokes by mapping each grid location on the 9×3 grid onto a key on the keyboard graphical user interface element, shown as QWERTY, AZERTY and QWERTZ variants in FIGS. 8, 9 and 10 respectively. For output, HNA 60 enhances the display by showing the indicia of a corresponding alphabetic key directly below each symbol.

Figure 11:
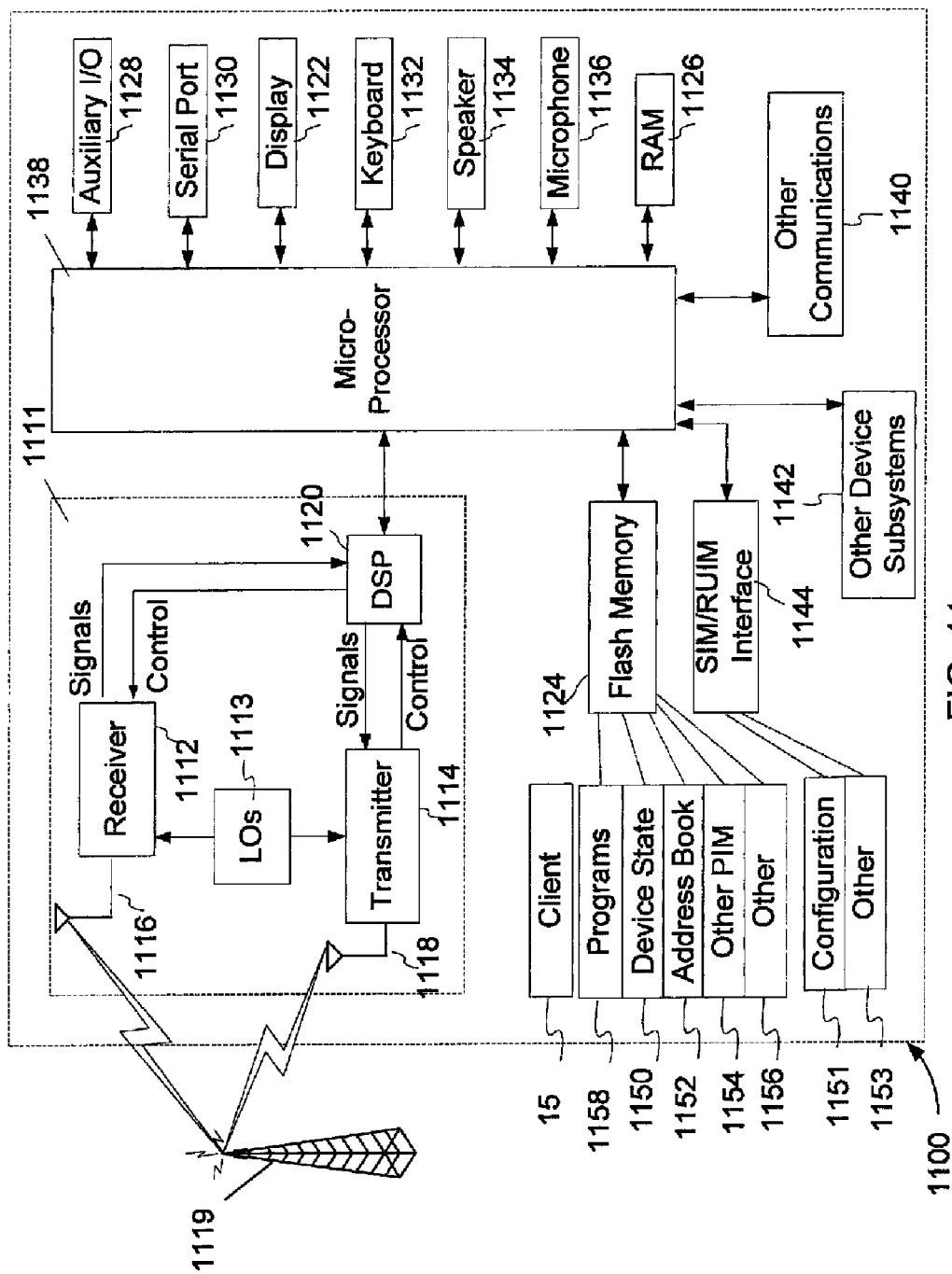
FIG. 11 is a block diagram illustrating a host mobile station.

Referring to the drawings, FIG. 11 is a block diagram illustrating a host mobile station including preferred embodiments of the techniques of the present application. Mobile station 1100 is preferably a two-way wireless communication device having at least voice and data communication capabilities. Mobile station 1100 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 1100 is enabled for two-way communication, it will incorporate a communication subsystem 1111, including both a receiver 1112 and a transmitter 1114, as well as associated components such as one or more, preferably embedded or internal, antenna elements 1116 and 1118, local oscillators (LOs) 1113, and a processing module such as a digital signal processor (DSP) 1120. As will be apparent to those skilled in the field of communications, the particular design of the communication subsystem 1111 will be dependent upon the communication network in which the device is intended to operate. For example, mobile station 1100 may include a communication subsystem 1111 designed to operate within the Mobitex™ mobile communication system, the DataTAC™ mobile communication system, GPRS network, UMTS network, EDGE network or CDMA network.

Network access requirements will also vary depending upon the type of network 1119. For example, in the Mobitex and DataTAC networks, mobile station 1100 is registered on the network using a unique identification number associated with each mobile station. In UMTS and GPRS networks, and in some CDMA networks, however, network access is associated with a subscriber or user of mobile station 1100. A GPRS mobile station therefore requires a subscriber identity module (SIM) card in order to operate on a GPRS network, and a RUIM in order to operate on some CDMA networks. Without a valid SIM/RUIM card, a GPRS/UMTS/CDMA mobile station may not be fully functional. Local or non-network communication functions, as well as legally required functions (if any) such as "911" emergency calling, may be available, but mobile station 1100 will be unable to carry out any other functions involving communications over the network 1100. The SIM/RUIM interface 1144 is normally similar to a card-slot into which a SIM/RUIM card can be inserted and ejected like a diskette or PCMCIA card. The SIM/RUIM card can have approximately 64K of memory and hold many key configuration 1151, and other information 1153 such as identification, and subscriber related information.

When required network registration or activation procedures have been completed, mobile station 1100 may send and receive communication signals over the network 1119. Signals received by antenna 1116 through communication network 1119 are input to receiver 1112, which may perform such common receiver functions as signal amplification, frequency down conversion, filtering, channel selection and the like, and in the example system shown in FIG. 11, analog to digital (A/D) conversion. A/D conversion of a received signal allows more complex communication functions such as demodulation and decoding to be performed in the DSP 1120. In a similar manner, signals to be transmitted are processed, including modulation and encoding for example, by DSP 1120 and input to transmitter 1114 for digital to analog conversion, frequency up conversion, filtering, amplification and transmission over the communication network 1119 via antenna 1118. DSP 1120 not only processes communication signals, but also provides for receiver and transmitter control. For example, the gains applied to communication signals in receiver 1112 and transmitter 1114 may be adaptively controlled through automatic gain control algorithms implemented in DSP 1120.

Network 1119 may further communicate with multiple systems (not shown). For example, network 1119 may communicate with both an enterprise system and a web client system in order to accommodate various clients with various service levels.

Mobile station 1100 preferably includes a microprocessor 1138 which controls the overall operation of the device. Communication functions, including at least data and voice communications, are performed through communication subsystem 1111. Microprocessor 1138 also interacts with further device subsystems such as the display 1122, flash memory 1124, random access memory (RAM) 1126, auxiliary input/output (I/O) subsystems 1128, serial port 1130, keyboard 1132, speaker 1134, microphone 1136, a short-range communications subsystem 1140 and any other device subsystems generally designated as 1142.

Some of the subsystems shown in FIG. 11 perform communication-related functions, whereas other subsystems may provide "resident" or on-device functions. Notably, some subsystems, such as keyboard 1132 and display 1122, for example, may be used for both communication-related functions, such as entering a text message for transmission over a communication network, and device-resident functions such as a calculator or task list.

Operating system software used by the microprocessor 1138 is preferably stored in a persistent store such as flash memory 1124, which may instead be a read-only memory (ROM) or similar storage element (not shown). Those skilled in the art will appreciate that the operating system, specific device applications, or parts thereof, may be temporarily loaded into a volatile memory such as RAM 1126. Received communication signals may also be stored in RAM 1126.

As shown, flash memory 1124 can be segregated into different areas for both computer programs 1158 and program data storage 1150, 1152, 1154 and 1156. These different storage types indicate that each program can allocate a portion of flash memory 1124 for their own data storage requirements. Microprocessor 1138, in addition to its operating system functions, preferably enables execution of software applications on the mobile station. A predetermined set of applications that control basic operations, including at least data and voice communication applications for example, will normally be installed on mobile station 1100 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 1119. In a preferred embodiment, the PIM data items are seamlessly integrated, synchronized and updated, via the wireless network 1119, with the mobile station user's corresponding data items stored or associated with a host computer system. Further applications may also be loaded onto the mobile station 1100 through the network 1119, an auxiliary I/O subsystem 1128, serial port 1130, short-range communications subsystem 1140 or any other suitable subsystem 1142, and installed by a user in the RAM 1126 or preferably a non-volatile store (not shown) for execution by the microprocessor 1138. Such flexibility in application installation increases the functionality of the device and may provide enhanced on-device functions, communication-related functions, or both. For example, secure communication applications may enable electronic commerce functions and other such financial transactions to be performed using the mobile station 1100.

In a data communication mode, a received signal such as a text message or web page download will be processed by the communication subsystem 1111 and input to the microprocessor 1138, which preferably further processes the received signal for output to the display 1122, or alternatively to an auxiliary I/O device 1128. A user of mobile station 1100 may also compose data items such as email messages for example, using the keyboard 1132, which is preferably a complete alphanumeric keyboard or telephone-type keypad, in conjunction with the display 1122 and possibly an auxiliary I/O device 1128. Such composed items may then be transmitted over a communication network through the communication subsystem 1111.

For voice communications, overall operation of mobile station 1100 is similar, except that received signals would preferably be output to a speaker 1134 and signals for transmission would be generated by a microphone 1136. Alternative voice or audio I/O subsystems, such as a voice message recording subsystem, may also be implemented on mobile station 1100. Although voice or audio signal output is preferably accomplished primarily through the speaker 1134, display 1122 may also be used to provide an indication of the identity of a calling party, the duration of a voice call, or other voice call related information for example.

Serial port 1130 in FIG. 11 would normally be implemented in a personal digital assistant (PDA)-type mobile station for which synchronization with a user's desktop computer (not shown) may be desirable, but is an optional device component. Such a port 1130 would enable a user to set preferences through an external device or software application and would extend the capabilities of mobile station 1100 by providing for information or software downloads to mobile station 1100 other than through a wireless communication network. The alternate download path may for example be used to load an encryption key onto the device through a direct and thus reliable and trusted connection to thereby enable secure device communication.

Other communications subsystems 1140, such as a short-range communications subsystem, is a further optional component which may provide for communication between mobile station 1100 and different systems or devices, which need not necessarily be similar devices. For example, the subsystem 1140 may include an infrared device and associated circuits and components or a Bluetooth™ communication module to provide for communication with similarly enabled systems and devices.

A mobile communications device, such as a phone, is typically formed of software, firmware, and hardware adapted to provide communications services over a wireless communications network. This process of forming the relationship between the mobile communications device and the service is known in the art as provisioning. Typically a network operator provisions the mobile via a subscription to a service contract. Thus, once the mobile has been provisioned, the user of the mobile is often referred to as a subscriber.

In a voice and data network such as GSM (Global System for Mobile Communication) and GPRS (General Packet Radio System), CDMA (Code Division Multiple Access), or various other third generation networks such as EDGE (Enhanced Data rates for GSM Evolution) or UMTS (Universal Mobile Telecommunications Systems), both voice and data services may be available to mobile communications devices. Example voice services include voice calling and Short Messaging Service (SMS). Example data services include Internet browsing, email, and Multimedia Messaging Service (MMS).

Although many services may be available on a given network, only those subscribers that use mobile communications devices that have been provisioned for those services will be able to benefit from them. This may present problems for the subscriber and the network operator alike. On one hand, the subscriber may desire an existing service he does not have, i.e. an upgrade, or desire disabling a service, i.e. a downgrade. On the other hand the operator may want to offer a new service, but may hesitate if subscribers cannot benefit from them.

One known solution is to provide an out of band communications link, such as a Universal Serial Bus, on the mobile communications device, and enable the subscriber to load new software onto the mobile via the out of band communication link using a personal computer, thus re-provisioning the device. This may be an unacceptable solution to both the subscriber and the operator as there is a significant risk that the mobile, by error, receives a wrong or incomplete load, and may require servicing. Furthermore, this solution may be unacceptable to the subscriber who does not have access to a personal computer.

However, since mobile station 1100 is a host communications device that hosts client 15, client 15 may be provisioned directly by a user of mobile station 1110.

Figure 12:
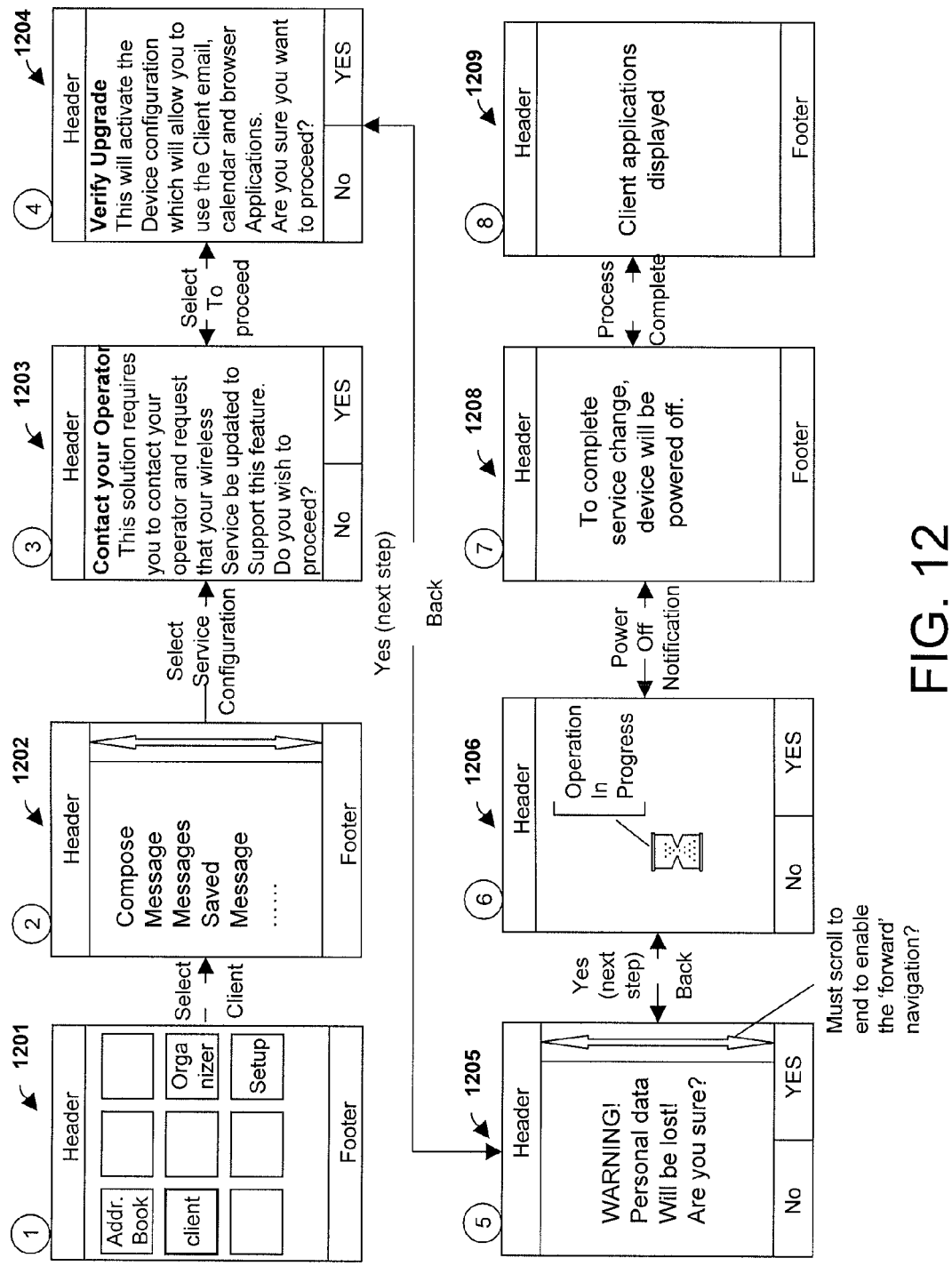
FIG. 12 is a flowchart showing the upgrade in the provisioning of a client.

Referring now to FIG. 12, an exemplary upgrade of client 15 is illustrated.

| Method of: | User upgrade to UPGRADED client service |
|---|---|
| Pre-Condition(s): | Device is configured to allow service change<br>Current Service Type = BASE<br>Service Lock = NO_LOCK<br>Service Change = NO_CHANGE |
| Acts and steps: | 1. USER activates service configuration menu item.<br>2. CLIENT examines factory settings for service type<br>3. CLIENT displays "Contact Operator" informational dialog to indicate to the user that they must do this in order to get service. (Display 1203)<br>4. USER selects to proceed.<br>5. CLIENT displays "Verification" informational dialog to indicate user desires to upgrade and indicates the need to reinstall desktop. (Display 1204)<br>6. USER selects to proceed.<br>7. CLIENT displays "Loss of Data" question to verify the user has done a backup prior performing upgrade. (Display 1205)<br>8. USER selects to proceed.<br>9. CLIENT saves new service type and sets 'service change' flag.<br>10. CLIENT informs Host applications of required change to point to Client applications<br>11. CLIENT triggers clear of Host calendar data. (Display 1206)<br>12. CLIENT informs user the device will be powered off. (Display 1207)<br>13. CLIENT requests Host to power off the device.<br>14. USER starts device.<br>15. HOST processes the change and clears 'service change' flag.<br>16. USER de-installs current Client desktop to remove base configured desktop<br>17. User re-installs Client desktop and selects Upgrade configuration.<br>18. USER connects device to Client desktop<br>19. Client Desktop synchronizes with wireless data server<br>20. Client Desktop associates identifier with user's corporate email account<br>21. Client Desktop downloads keys & service books<br>22. Client Desktop performs bulk download of calendar<br>23. CLIENT registers on network<br>24. USER starts receiving wireless email and calendar events. |

-continued

| | |
|---|---|
| Method of: | User upgrade to UPGRADED client service |
| Post Condition(s): | Provisioning recorded as complete.<br>Current Service Type = UPGRADED<br>Service Lock = NO_LOCK<br>Service Change = NO_CHANGE |

Figure 13:
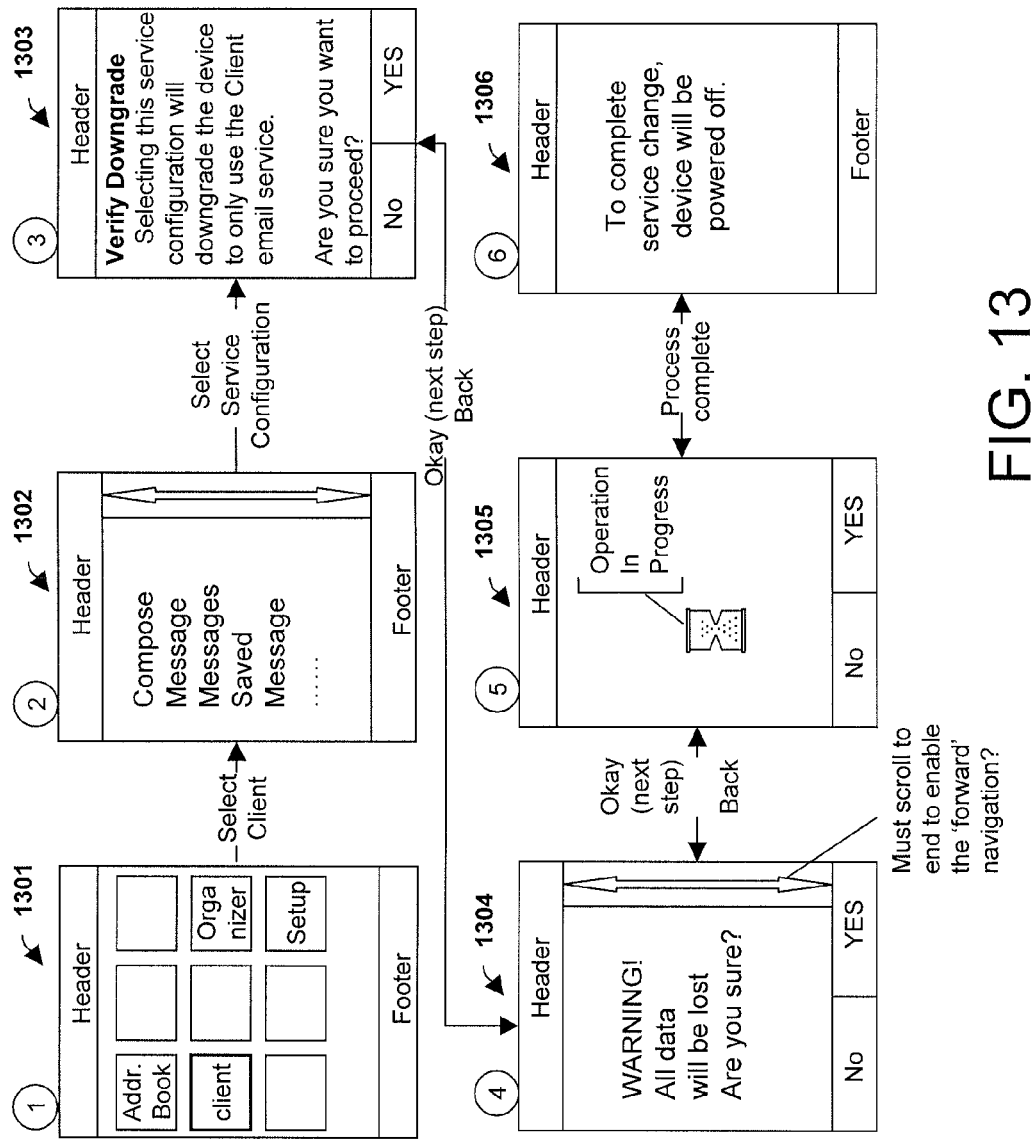
FIG. 13 is a flowchart showing the downgrade in the provisioning of a client.

Referring now to FIG. 13, an exemplary downgrade of client 15 is illustrated.

| | User wants to downgrade to base service |
|---|---|
| Method of: | user downgrade to base service |
| Pre-Condition(s): | Device is configured to allow service change<br>Current Service Type = BASE<br>Service Lock = NO_LOCK<br>Service Change = NO_CHANGE |
| Acts and steps: | 1. USER activates service configuration menu item.<br>2. CLIENT examines factory settings for service type<br>3. CLIENT displays "Verification" informational dialog to indicate user desires to downgrade. (Display 1303)<br>4. USER selects to proceed.<br>5. CLIENT displays "Loss of Data" question to verify the user has done a backup prior performing upgrade. (Display 1304)<br>6. USER selects to proceed.<br>7. CLIENT saves current service type<br>8. CLIENT informs Host applications of required change to point to Host applications<br>9. CLIENT performs delete of all data contained in the CLIENT file system<br>10. CLIENT informs Host applications to perform "KillDevice" IT policy request to clear all corporate data in Host file systems. (Display 1305)<br>11. CLIENT sets the 'service change' flag.<br>12. CLIENT informs user the device will be powered off. (Display 1306)<br>13. CLIENT requests Host to power off the device.<br>14. USER starts device.<br>15. HOST processes the change and clears 'service change' flag.<br>16. USER de-installs current Client desktop to remove upgrade configured desktop<br>17. User re-installs Client desktop and selects base configuration. |
| Post Condition(s): | Provisioning recorded as complete.<br>Current Service Type = BASE<br>Service Lock = NO_LOCK<br>Service Change = NO_CHANGE |

Thus, the host device user is enabled to upgrade or downgrade client service, i.e. to provision the data client.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

I claim:

1. A mobile device certified for operation in a wireless network, the mobile device comprising:
    a host having at least one host application configured to change device settings of the mobile device;
    a data communications client comprising a virtual machine executing a number of client applications using a client operating system, the data communications client communicating with one or more of the at least one host application,
    a notifier configured to notify the data communications client of device settings changes on the host device in order to propagate device settings to the data communications client;
    a mode setting at the data communications client, said mode setting configured to indicate whether client applications on the data communications client should use device settings from said host device; and
    a client settings application in the data communications client configured to receive a notification from the notification means and change device settings for said client applications if said mode setting indicates said client applications should use device settings from said host device.

2. The mobile device of claim 1, wherein the notifier includes a listener at said host, said listener configured to monitor said host applications for device settings changes.

3. The mobile device of claim 2, wherein said listener is further configured to notify the client settings application.

4. The mobile device of claim 1, wherein the notifier includes a polling application located at said data communications client, said polling application configured to poll said at least one host application to determine whether a device settings change has been made.

5. The mobile device of claim 4, further comprising a graphical user interface monitor configured to determine when a client application has taken control of a graphical user interface on the host device.

6. The mobile device of claim 5, wherein said polling application polls said at least one host application when said graphical user interface monitor determines that the client application has taken control of the graphical user interface on the host device.

7. The mobile device of claim 1, further comprising an abstraction layer and a native interface layer between said at least one host application and said client settings application, said abstraction layer and native interface layer configured for a particular host application.

8. The mobile device of claim 1, wherein he mode setting is a flag that persisted.

9. The mobile device of claim 1, further comprising a conflict resolution application, said conflict resolution application configured to provide an alternative supported setting if said data communications client does not support a setting set at said at least one host application.

10. The mobile device of claim 9, wherein said conflict resolution application includes one of a mapping table to map unsupported settings with the alternative supported setting and a prompting user to select the alternative supported setting.

11. A method of operating a mobile device operating in a wireless network, the mobile device having a host and data communications client, the method comprising:
    arranging for a client operating system, the client operating system being on the data communications client and comprising a virtual machine executing a number of client applications, to communicate with at least one host application;
    changing device settings on the mobile device using the at least one host application;
    notifying the data communications client of device settings changes by the at least one host application;
    checking a mode setting at the data communications client to determine whether device settings changed at the host device should be propagated to the data communications client; and
    if the checking step determines changes should be propagated, changing device settings for said data communications client.

12. The method of claim 11, wherein the notifying step includes listening for changes at said host, said listening step monitoring said host applications for device settings changes.

13. The method of claim 11, wherein the notifying step polls said at least one host application to determine whether a change in device settings has occurred.

14. The method of claim 13, wherein said polling step is activated when a client application has taken control of a graphical user interface on the host device.

15. The method of claim 11, further comprising a translating step, the translating step occurring in an abstraction layer and a native interface layer between said host application and the data communications client, said translating step allowing a particular host application to communicate with the data communications client.

16. The method of claim 11, wherein the checking step checks a flag at a preset memory location.

17. The method of claim 11, further comprising the step of resolving conflicts before said changing step, said resolving conflicts step providing an alternative supported setting to said data communications client if said data communications client does not support a setting set in said changing step.

18. The method of claim 17, wherein said conflict resolving step chooses the alternative supported setting from a mapping table that maps unsupported settings with the alternative supported setting.

19. The method of claim 17, wherein the conflict resolving step prompts a user to select the alternative supported setting.

* * * * *